US012236024B2

United States Patent
Kake et al.

(10) Patent No.: US 12,236,024 B2
(45) Date of Patent: Feb. 25, 2025

(54) ELECTRONIC PEN

(71) Applicant: Wacom Co., Ltd., Saitama (JP)

(72) Inventors: Akiyuki Kake, Saitama (JP); Ipei Hung, Saitama (JP); Kizuku Ishimaru, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/324,844

(22) Filed: May 26, 2023

(65) Prior Publication Data
US 2023/0297178 A1 Sep. 21, 2023

Related U.S. Application Data

(63) Continuation of application No. PCT/JP2021/031690, filed on Aug. 30, 2021.

(30) Foreign Application Priority Data

Nov. 27, 2020 (JP) .................. 2020-197145

(51) Int. Cl.
*G06F 3/0354* (2013.01)
*G06F 3/0362* (2013.01)
*G06F 3/038* (2013.01)

(52) U.S. Cl.
CPC ........ *G06F 3/0383* (2013.01); *G06F 3/03545* (2013.01); *G06F 3/0362* (2013.01);
(Continued)

(58) Field of Classification Search
CPC .. G06F 3/0383; G06F 3/03545; G06F 3/0362; G06F 2203/0384; G06F 2203/0339
See application file for complete search history.

(56) References Cited

U.S. PATENT DOCUMENTS 5,635,683 A * 6/1997 McDermott .......... G06F 3/0414
338/47
9,582,098 B2 * 2/2017 Rosenberg ........ G06F 3/041661
(Continued)

FOREIGN PATENT DOCUMENTS

GB 2409277 A 6/2005
JP H0665929 A 3/1994
(Continued)

OTHER PUBLICATIONS

International Search Report, mailed Nov. 2, 2021, for International Patent Application No. PCT/JP2021/031690. (7 pages) (with English Translation).
(Continued)

*Primary Examiner* — Gene W Lee
(74) *Attorney, Agent, or Firm* — Seed IP Law Group LLP

(57) ABSTRACT

An electronic pen is realized which includes a side switch that has a simple configuration and enables instruction inputs of a plurality of states to be performed easily and properly. The electronic pen has a side switch unit provided at a side surface of a pen body to be gripped by a user. The side switch unit includes a sensor unit in which capacitive sensors and pressure sensing sensors are provided as two kinds of touch sensors of different detection systems such that sensor regions (detection regions) are superimposed on each other. Thus, at least a case of performing an operation in such a manner as to act on one touch sensor and a case of performing an operation in such a manner as to act on both touch sensors simultaneously can be indicated through the side switch unit.

9 Claims, 8 Drawing Sheets

(52) U.S. Cl.
CPC .............. *G06F 2203/0339* (2013.01); *G06F 2203/0384* (2013.01)

(56) References Cited

U.S. PATENT DOCUMENTS

| | | | | |
|---|---|---|---|---|
| 2012/0050221 | A1* | 3/2012 | Kolokowsky | G06F 3/0445 345/174 |
| 2012/0331546 | A1* | 12/2012 | Falkenburg | G06T 11/001 726/16 |
| 2016/0179222 | A1* | 6/2016 | Chang | G06F 3/03545 345/179 |
| 2016/0195955 | A1* | 7/2016 | Picciotto | G06F 3/04144 345/174 |
| 2017/0052610 | A1* | 2/2017 | Large | G06F 3/0485 |
| 2017/0371437 | A1* | 12/2017 | Lin | G06F 3/0442 |
| 2019/0187835 | A1* | 6/2019 | Griffin | H04W 4/20 |
| 2020/0249775 | A1 | 8/2020 | Ruscher et al. | |
| 2020/0363880 | A1 | 11/2020 | Bogan et al. | |

FOREIGN PATENT DOCUMENTS

| | | |
|---|---|---|
| JP | H10269007 A | 10/1998 |
| JP | 2000047805 A | 2/2000 |
| JP | 2018106616 A | 7/2018 |
| JP | 2018124619 A | 8/2018 |
| JP | 2019125083 A | 7/2019 |
| WO | 2016111876 A1 | 7/2016 |
| WO | 2017043214 A1 | 3/2017 |

OTHER PUBLICATIONS

Partial Supplementary European Search Report, dated Mar. 13, 2024, for European Patent Application No. 21897433.5-1244. (17 pages).

* cited by examiner

F I G. 2 A
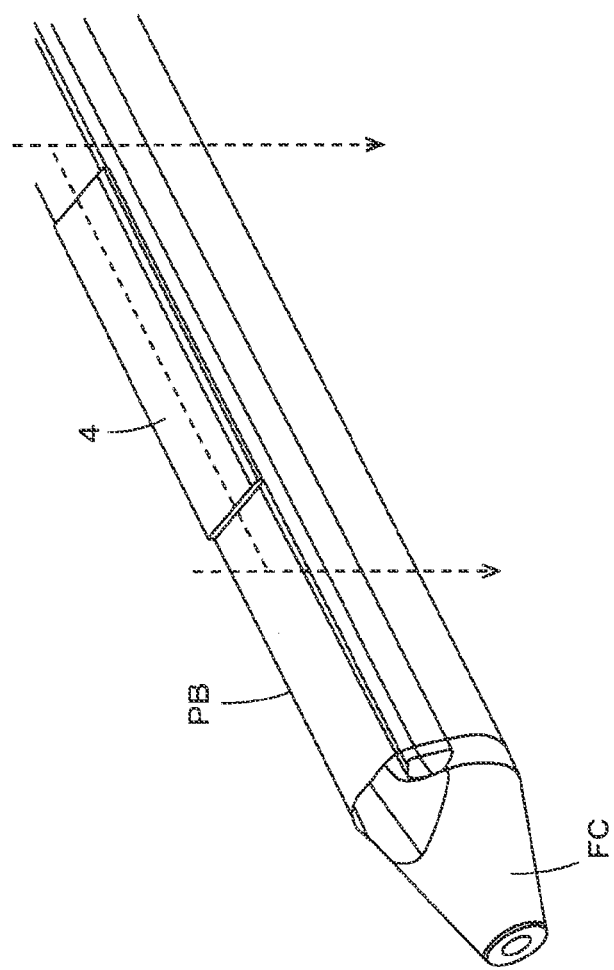
F I G. 2 B
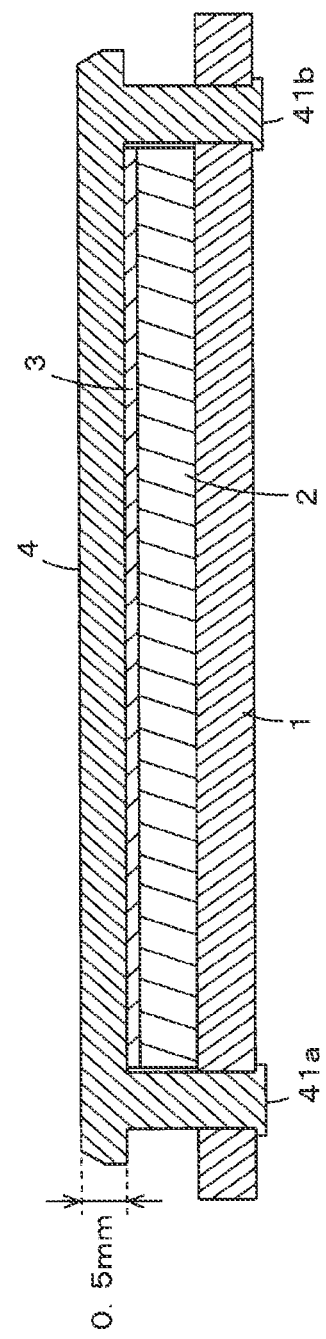

FIG.4A
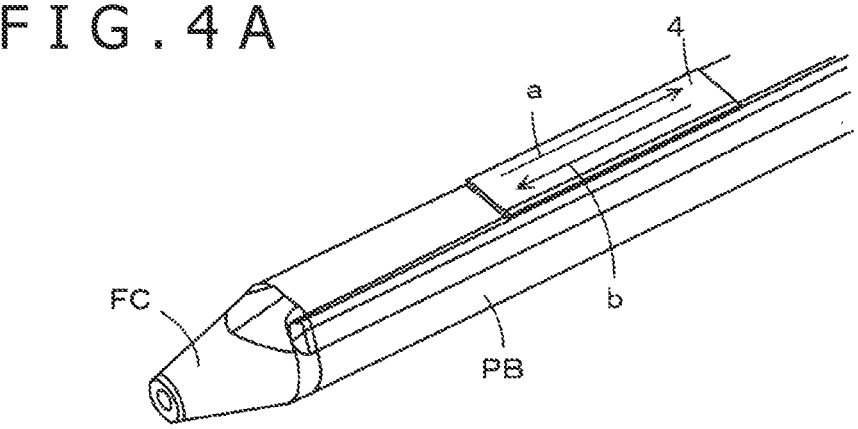
FIG.4B  SLIDE UP (ARROW a)
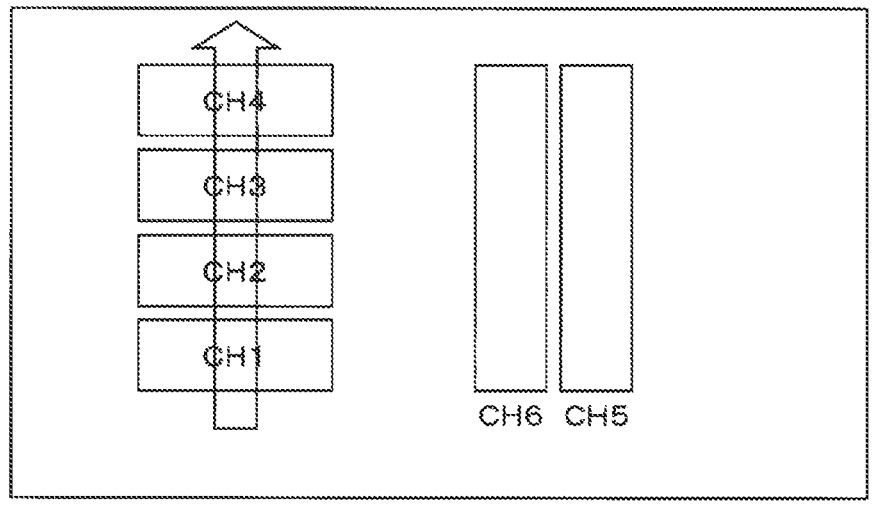
FIG.4C  SLIDE DOWN (ARROW b)
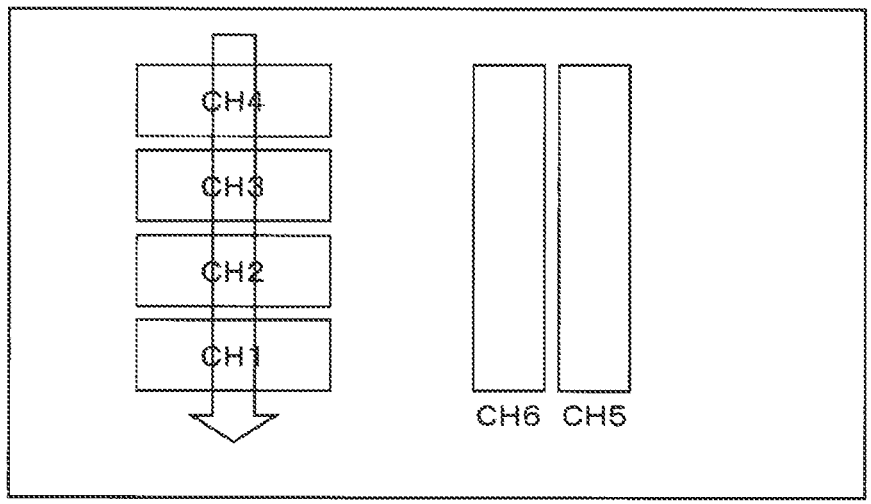

FIG.5A
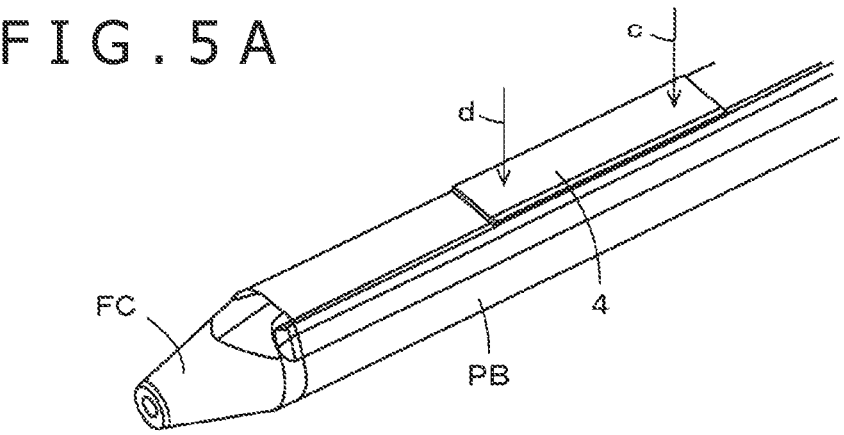
FIG.5B  UPPER PUSH (ARROW c)
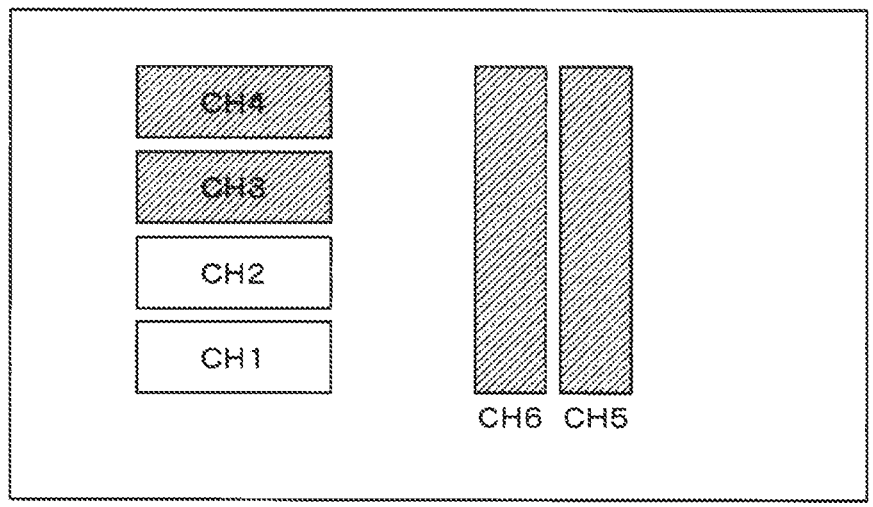
FIG.5C  LOWER PUSH (ARROW d)
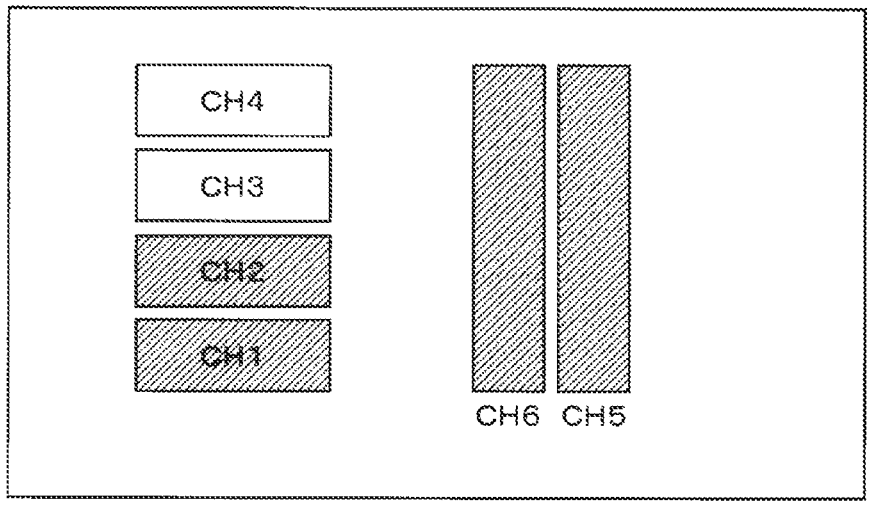

FIG.6A
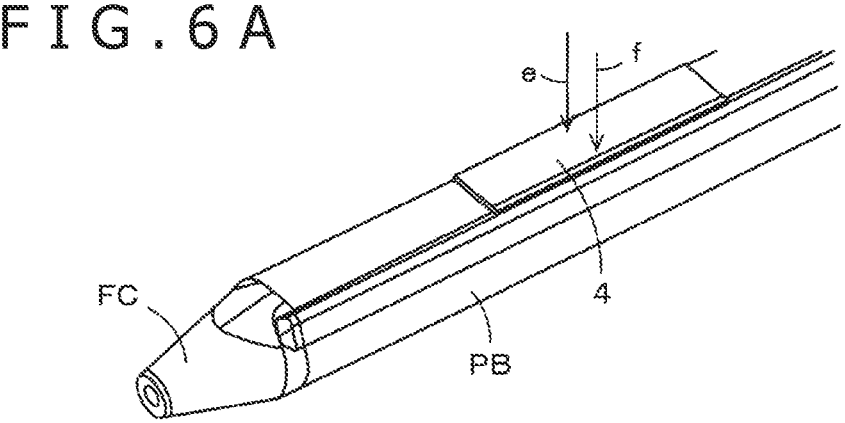
FIG.6B  RIGHT PUSH (ARROW e)
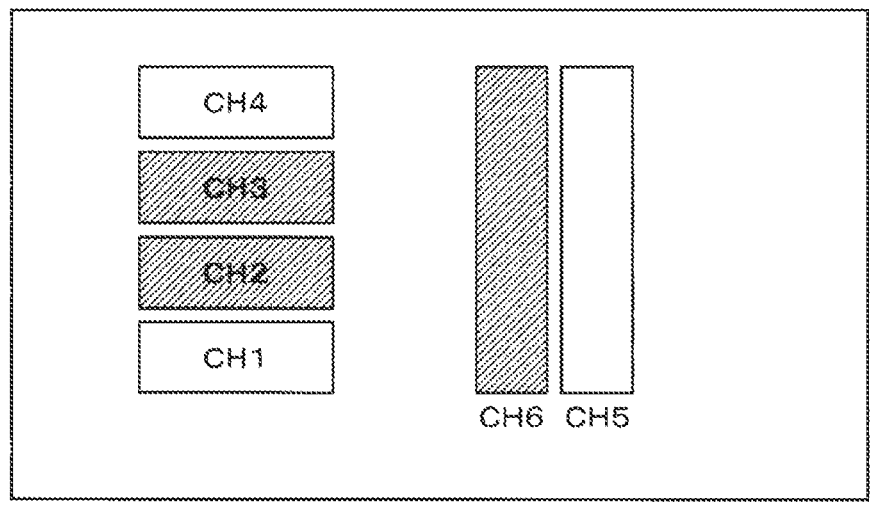
FIG.6C  LEFT PUSH (ARROW f)
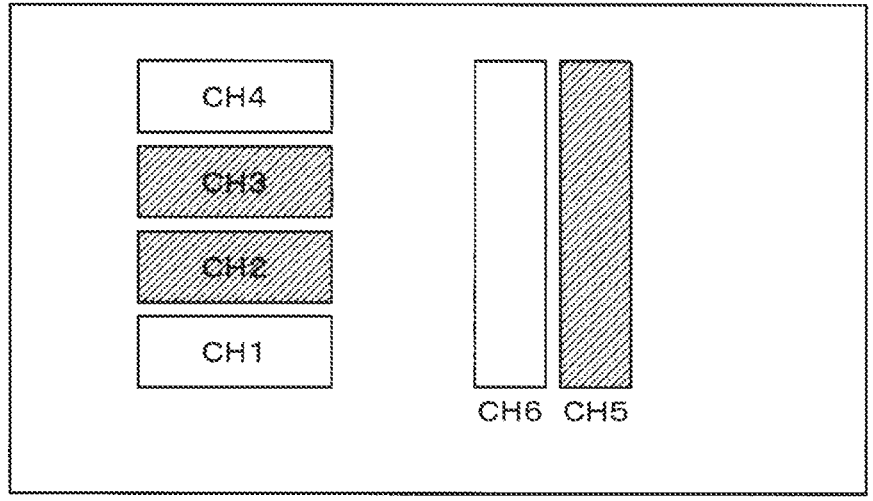

FIG.7

EXAMPLE OF DATA STORED IN INSTRUCTION CONTENT DETERMINATION TABLE

| OPERATION OUTLINE | CAPACITIVE SENSOR | | | | PRESSURE SENSING SENSOR | | INSTRUCTION CONTENT |
|---|---|---|---|---|---|---|---|
| | CH1 | CH2 | CH3 | CH4 | CH5 | CH6 | |
| UPWARD SLIDE | SEQUENTIALLY CHANGING TO "1" → | | | | 0 | 0 | SLIDING UP |
| DOWNWARD SLIDE | ← SEQUENTIALLY CHANGING TO "1" | | | | 0 | 0 | SLIDING DOWN |
| UPPER PUSH | 0 | 0 | 1 | 1 | 1 | 1 | CLICKING UP |
| LOWER PUSH | 1 | 1 | 0 | 0 | 1 | 1 | CLICKING DOWN |
| RIGHT PUSH | 0 | 1 | 1 | 0 | 1 | 0 | CLICKING RIGHT |
| LEFT PUSH | 0 | 1 | 1 | 0 | 0 | 1 | CLICKING LEFT |

ELECTRONIC PEN

BACKGROUND

Technical Field

The present disclosure relates to an electronic pen that enables information to be input by indicating coordinates to a position detecting device incorporated in an electronic apparatus such as a tablet personal computer (PC), for example.

Description of the Related Art

Some electronic apparatuses such as tablet PCs and advanced mobile telephone terminals referred to as smart phones or the like enable indication input by an electronic pen for finer drawing input through an incorporated position detecting device. Enabling the use of what is generally called a side switch also in such an electronic pen has been considered. The side switch in the electronic pen refers to a switch that is provided to a side surface of the electronic pen in such a manner as to be operable by a finger while the electronic pen is gripped.

Some side switches in electronic pens are, for example, formed by using a small switch that is mechanically switched on/off. However, Patent Document 1 discloses a design related to an electronic pen in which a side switch is formed by using a touch sensor in order to realize an easy-to-use electronic pen (position indicator) such that an operation pressure on the side switch is light. The electronic pen of the design disclosed in Patent Document 1 is formed by connecting touch sensor electrodes forming a pair (set) as variable resistance elements to a tuning circuit including a coil and a capacitor, and providing the touch sensor electrodes forming a pair to a side surface of a casing of the electronic pen.

A user can change a characteristic such as a reactance, an impedance, or what is generally called a Q-value of the tuning circuit by establishing a connection between the touch sensor electrodes forming a pair by a fingertip. That is, an on/off state of the side switch can be indicated by the characteristic of the tuning circuit which characteristic changes between a case where a connection is established between the touch sensor electrodes forming a pair by a finger and a case where no connection is established therebetween. Incidentally, the electronic pen of the design disclosed in Patent Document 1 is of an electromagnetic coupling type that performs position indication or the like by transmitting and receiving a magnetic field between a position detecting device and the electronic pen.

PRIOR ART DOCUMENT

Patent Document

Patent Document 1: Japanese Utility Model Laid-Open No. Hei06-65929

BRIEF SUMMARY

Technical Problems

In the case of the design disclosed in Patent Document 1, instructions that can be given through the side switch are on/off switching operations. In order to enable instruction inputs of a plurality of states, a plurality of pairs of (sets of) touch sensor electrodes need to be provided, as illustrated in FIG. 1B of Patent Document 1. In this case, because the area of the side surface of the electronic pen is limited, operability may be impaired by, for example, making it difficult to hold the electronic pen in the case where the plurality of pairs of touch sensor electrodes are provided. In addition, an erroneous operation may tend to occur in the case where the plurality of pairs of (sets of) touch sensor electrodes are provided.

In view of the above, it is an object of the present disclosure to realize an electronic pen including a side switch that has a simple configuration and enables instruction inputs of a plurality of states to be performed easily and properly.

Technical Solution

In order to solve the above-described problems, there is provided an electronic pen including a tubular casing configured to be held by a user, and a side switch unit provided at a side surface of the tubular casing and configured to receive an operation input by the user, the side switch unit including a sensor unit in which two kinds of touch sensors of different detection systems are disposed such that respective sensor regions of the two kinds of the touch sensors are superimposed on each other.

According to this electronic pen, the side switch unit is provided to the side surface of the tubular casing to be held by the user. This side switch unit includes the sensor unit in which the two kinds of touch sensors of different detection systems are disposed such that the respective sensor regions (detection regions) of the two kinds of touch sensors are superimposed on each other. Thus, at least a case of performing an operation in such a manner as to act on one touch sensor and a case of performing an operation in such a manner as to act on both touch sensors simultaneously can be indicated through the side switch unit.

Incidentally, the words "touch sensor" in the present specification refers to a sensor that detects proximity or contact of a finger of a human body as a dielectric, a sensor that detects application of a pressure by being pressed by a finger of a human body or the like, and the like. In other words, the touch sensor includes various sensors that detect operations by a finger of a human body and the like.

BRIEF DESCRIPTION OF THE SEVERAL VIEWS OF THE DRAWINGS

FIGS. 2A and 2B are diagrams of assistance in explaining a laminated structure of the side switch unit of the electronic pen according to the embodiment of the present disclosure.

FIGS. 4A to 4C are diagrams of assistance in explaining modes of operation on the side switch unit of the electronic pen according to the embodiment of the present disclosure.

FIGS. 5A to 5C are diagrams of assistance in explaining modes of operation on the side switch unit of the electronic pen according to the embodiment of the present disclosure.

FIGS. 6A to 6C are diagrams of assistance in explaining modes of operation on the side switch unit of the electronic pen according to the embodiment of the present disclosure.

FIG. 7 is a diagram of assistance in explaining association of the modes of operation on the side switch unit of the electronic pen according to the embodiment of the present disclosure with instruction contents.

DETAILED DESCRIPTION

An embodiment of an electronic pen according to the present disclosure will hereinafter be described with reference to the drawings. As electronic pen systems, there are various systems such as an active capacitive coupling system (active electrostatic (AES) system) and an electromagnetic induction system (electro magnetic resonance (EMR) system). The electronic pen according to the present disclosure is characterized by the configuration of a side switch unit. Therefore, the electronic pen according to the present disclosure is applicable to electronic pens of any system as long as the electronic pen has a side switch. In the following, description will be made of the electronic pen according to the present disclosure, centering on the configuration of the characteristic side switch unit.

Example of Configuration of Side Switch Unit

Figure 1:
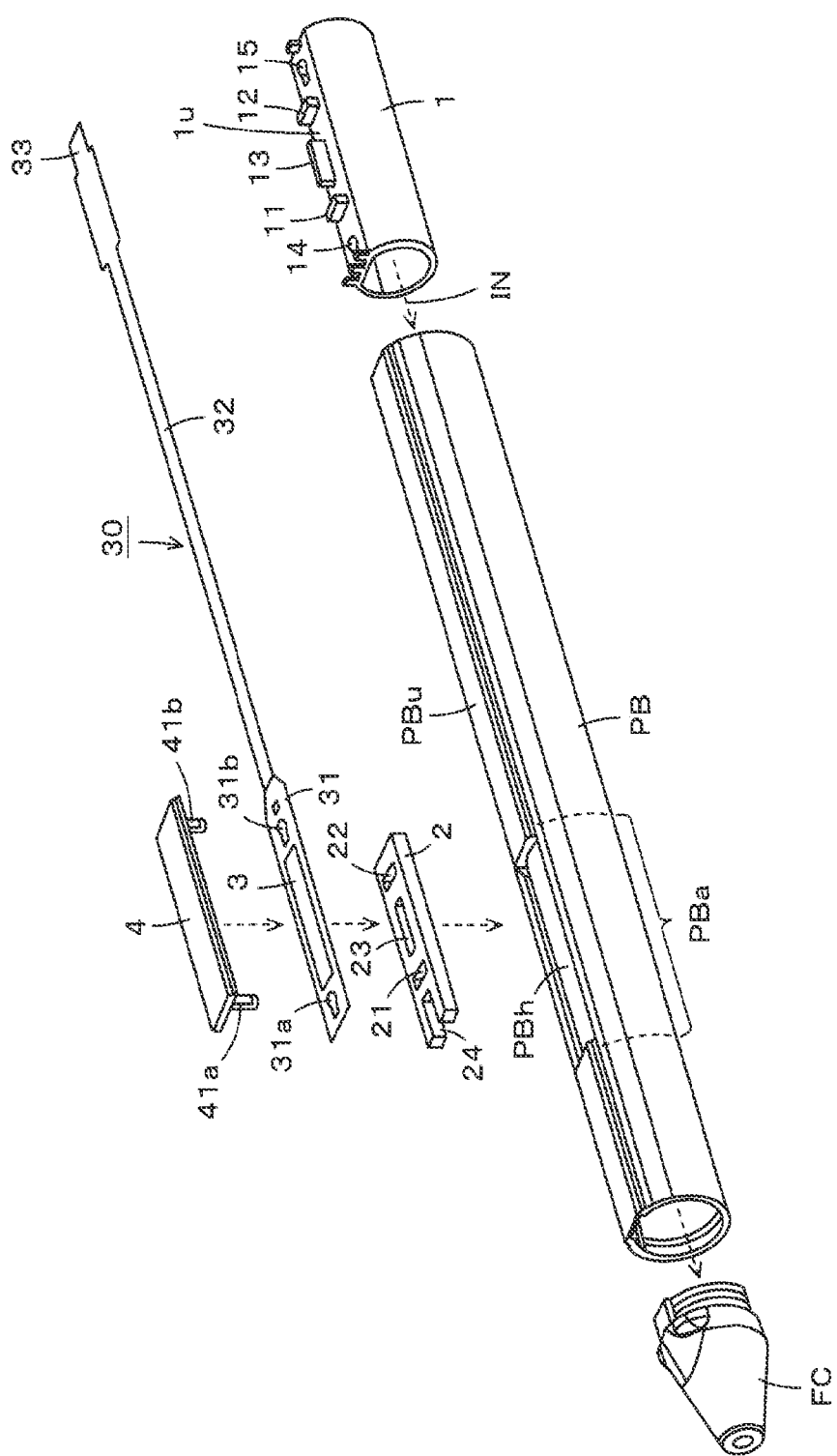
FIG. 1 is an exploded perspective view of assistance in explaining an example of a configuration of a side switch unit of an electronic pen according to an embodiment of the present disclosure.

FIG. 1 is an exploded perspective view of assistance in explaining an example of a configuration of a side switch unit of an electronic pen according to the embodiment. The electronic pen according to the present disclosure is formed by mounting an electronic pen main body unit in an external casing. The external casing in the case of the electronic pen illustrated in FIG. 1 is a part including a front cap FC, a pen body PB, and a rear cap (not illustrated). The front cap FC is a tapered (taper-shaped) part that is fitted to a distal end side of the pen body PB and from which a pen tip portion of a core body is protruded. The pen body (tubular casing) PB is a part held by a user. The rear cap is a part having a function of closing a rear end opening of the pen body PB. In addition, though not illustrated in the figure, the electronic pen main body unit mounted within the external casing is a part that is formed by including various parts such as the core body, a pen pressure detecting portion, a circuit board, and a battery and which implements functions as an electronic pen, the functions including a position indicating function and the like.

Further, the electronic pen according to the present embodiment includes the side switch unit that is formed by using two kinds of touch sensors of different detection systems. As illustrated in FIG. 1, the pen body PB is of a substantially cylindrical shape, and an upper side part of a side surface of the pen body PB is flat. This flat part of the side surface of the pen body PB will be described as a planar portion PBu. A rectangular opening portion PBh for providing the side switch unit is provided at a position of the planar portion PBu which position is slightly to the front cap FC side. In the part of the opening portion PBh in the electronic pen according to the present embodiment, the side switch unit is formed by laminating a holding member 1, an elastic member 2, a sensor unit 3, and an operating member 4.

As illustrated in FIG. 1, the holding member 1 is of a substantially cylindrical shape, and as in the pen body PB, an upper side part of a side surface of the holding member 1 is flat. The flat part of the side surface of the holding member 1 will be described as a planar portion 1u. The planar portion 1u is provided with one pair of first projecting portions (ribs) 11 and 12 having a width extending in a direction intersecting an axial direction and a second projecting portion (pivot) 13 having a width extending in the axial direction. In addition, the planar portion 1u of the holding member 1 is provided with a fitting hole 14 on a front end side and a fitting hole 15 on a rear end side. The holding member 1 is inserted into the pen body PB as indicated by an arrow IN in FIG. 1, and is pushed into the part of the opening portion PBh. Projections provided at both ends of the planar portion 1u of the holding member 1 engage with projections on an inner wall surface of the pen body PB, so that the holding member 1 is fixed in a position PBa. The planar portion 1u of the holding member 1 is visible through the opening portion PBh in a state in which the holding member 1 is fixed in the position PBa.

The elastic member 2 in a rectangular shape is mounted through the opening portion PBh onto the planar portion 1u of the holding member 1 fixed in the position PBa within the pen body PB. In the present embodiment, the elastic member 2 is formed by PORON (registered trademark), which is a high-functionality urethane foam. Needless to say, the elastic member 2 can also be formed by another elastic material, for example, a rubber, a sponge, or the like. The elastic member 2 functions in such a manner that, when the side switch unit is depressed, a pressure is applied slowly rather than being applied sharply. Thus, the elastic member 2 causes pressure sensing sensors to be described later not to react when the side switch unit is depressed only slightly, but causes the pressure sensing sensors to function when the side switch unit is depressed surely. In addition, first hole portions 21 and 22 are provided at positions of the elastic member 2 which positions correspond to the first projecting portions 11 and 12 of the holding member 1. In addition, a second hole portion 23 is provided at a position of the elastic member 2 which position corresponds to the second projecting portion 13 of the holding member 1.

Thus, when the elastic member 2 is mounted on the planar portion 1u of the holding member 1, the first projecting portions 11 and 12 and the second projecting portion 13 of the holding member 1 are fitted into the first hole portions 21 and 22 and the second hole portion 23 of the elastic member 2. In the present embodiment, the height of the first projecting portions 11 and 12 and the second projecting portion 13 is made substantially the same as the thickness of the elastic member 2, so that upper surfaces of the first projecting portions 11 and 12 and the second projecting portion 13 are located on substantially the same plane as an upper surface of the elastic member 2.

The sensor unit 3 formed on a flexible board 30 is disposed on the upper surface of the elastic member 2. The flexible board 30 is a deformable printed wiring board having flexibility, in which wiring board a thin insulating material, for example, a plastic film, is used. The flexible board 30 is an elongate board including a sensor arrangement portion 31, an extending portion 32, and a connector portion 33. The sensor arrangement portion 31 is a part whose lateral width is slightly widened because the sensor unit 3 is disposed on the sensor arrangement portion 31. A hole portion 31a is provided on a front end side of the sensor arrangement portion 31. A hole portion 31b is provided on a rear end side of the sensor arrangement portion 31.

The extending portion 32 is a part extended in a rear end direction from a rear end of the sensor arrangement portion 31. The extending portion 32 has a lateral width narrower than that of the sensor arrangement portion 31. Conductive wires that are led out from the sensor unit 3 disposed on the sensor arrangement portion 31 and are extended in the rear end direction are disposed on the extending portion 32. The connector portion 33 is a part provided, for each conductive wire extended from the sensor unit 3, with a connection terminal to which the conductive wire is connected. Incidentally, as will be described later in detail, the sensor unit 3 is a part formed by laminating two kinds of touch sensors of different detection systems in such a manner that respective sensor regions of the touch sensors are superposed on each other.

The thus formed flexible board 30 is inserted from the rear end opening of the pen body PB, and the sensor arrangement portion 31 is positioned on the upper surface of the elastic member 2. The sensor unit 3 disposed on the sensor arrangement portion 31 is thus superposed on the elastic member 2. In addition, the connector portion (plug portion) 33 of the flexible board 30 is inserted into and connected to a predetermined connector portion (jack portion) of the circuit board of the electronic pen main body unit not illustrated.

Thus, detection outputs from the respective touch sensors constituting the sensor unit 3 are led out to respective terminal portions of the connector portion 33 through the extending portion 32, and are supplied to the circuit board of the electronic pen main body unit not illustrated. The electronic pen main body unit can multiplex the detection outputs from the touch sensors constituting the side switch unit in a position indication signal and send out the multiplexed detection outputs to a position detecting device side, or send out the detection outputs to the position detecting device side by short-range wireless communication.

The operating member 4 is disposed on an upper surface of the sensor unit 3. The operating member 4 is, for example, a rectangular plate-shaped body formed of a resin material, and is provided with leg portions 41a and 41b on an outside of a bottom surface of the operating member 4. When the operating member 4 is mounted onto the sensor unit 3, the leg portions 41a and 41b are fitted into the fitting holes 14 and 15 of the holding member 1 through the hole portions 31a and 31b of the sensor arrangement portion 31. Consequently, the elastic member 2, the sensor arrangement portion 31 having the sensor unit 3 disposed thereon, and the operating member 4 are fixed to the holding member 1 fixed to the pen body PB, and function as the side switch unit of the electronic pen.

FIGS. 2A and 2B are diagrams of assistance in explaining a laminated structure of the side switch unit of the electronic pen according to the embodiment. In FIGS. 2A and 2B, FIG. 2A is an external view of a part on a pen tip side which part includes the side switch unit of the electronic pen according to the embodiment, and FIG. 2B is a sectional view of the side switch unit sectioned at a position indicated by dotted line arrows in FIG. 2A. The side switch unit of the electronic pen according to the present embodiment is formed on the side surface on the pen tip side of the electronic pen, as illustrated in FIG. 1 and FIG. 2A, and is of a four-layer structure, as illustrated in FIG. 2B.

That is, the side switch unit is formed by mounting the elastic member 2 on the planar portion 1u of the holding member 1 fixed to the part of the opening portion PBh within the pen body PB, mounting the sensor unit 3 on the elastic member 2, and mounting the operating member 4 on the sensor unit 3. Because the leg portions 41a and 41b provided to the outside bottom surface of the operating member 4 are fitted into the fitting holes 14 and 15 of the planar portion 1u of the holding member 1, the four parts described above function as the side switch unit provided to the electronic pen without falling apart. Incidentally, in the side switch unit of the electronic pen according to the present embodiment, the operating member 4 has a thinness of approximately 0.5 mm, as illustrated in FIG. 2B.

In the present embodiment, in a state in which the leg portions 41a and 1b of the operating member 4 are fitted in the fitting holes 14 and 15 of the holding member 1, an upper surface of the operating member 4 is located within substantially the same plane as the planar portion PBu of the pen body PB. However, there is no limitation to this. The position of the upper surface of the operating member 4 can be changed by adjusting the thickness, shape, or the like of the operating member 4, the elastic member 2, or the holding member 1. That is, the position of the upper surface of the operating member 4 can be set to be a position lowered from the planar portion PBu of the pen body PB toward the inside of the pen body PB, or conversely, the position of the upper surface of the operating member 4 can be set to be a position protruding outward from the planar portion PBu of the pen body PB.

Incidentally, FIG. 2B does not illustrate the flexible board 30 on which the sensor unit 3 is provided in order to simplify the description. Similarly, not illustrated are the first projecting portions 11 and 12 and the second projecting portion 13 provided to the planar portion 1u of the holding member 1 and the first hole portions 21 and 22 and the second hole portion 23 of the elastic member 2 which hole portions are provided in correspondence with these projecting portions.

Thus, the electronic pen according to the present embodiment has the front cap FC connected to a front end of the pen body PB, and the holding member 1 is inserted into the pen body PB and fixed to the fixed position PBa corresponding to the opening portion PBh. The side switch unit is formed by laminating the elastic member 2, the sensor unit 3, and the operating member 4 on the holding member 1. As described with reference to FIG. 1, the detection outputs from the respective sensors of the sensor unit 3 of the side switch unit are supplied to the electronic pen main body unit through the conductive wires on the extending portion 32 of the flexible board 30 and the connection terminals of the connector portion 33.

The electronic pen main body unit is inserted from the rear end opening portion of the pen body PB, and a front end of the electronic pen main body unit passes through the inside of the pen body PB, penetrates the holding member 1, and reaches the front cap FC to project a front end (pen tip portion) of the core body from a front end opening of the front cap FC. The rear cap is fitted to the rear end opening of the pen body PB after the electronic pen main body unit is loaded. Thus, the electronic pen main body unit is fixed to the inside of the external casing, and one electronic pen is formed as a whole.

Example of Configuration of Sensor Unit

Figure 3A:
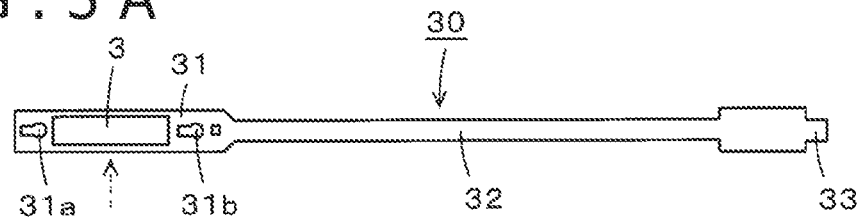
FIGS. 3A to 3D are diagrams of assistance in explaining a sensor unit included in the side switch unit of the electronic pen according to the embodiment of the present disclosure.
Figure 3B:
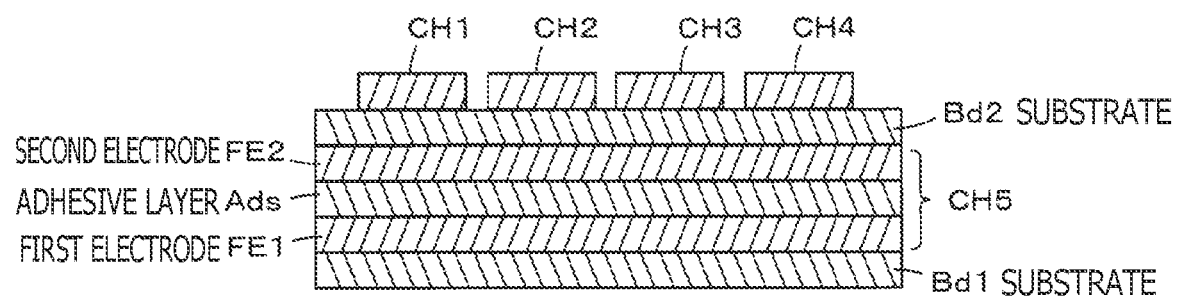

FIGS. 3A to 3D are diagrams of assistance in explaining the sensor unit 3 included in the side switch unit of the electronic pen according to the embodiment. In FIGS. 3A to 3D, FIG. 3A is a general view of the flexible board 30 on which the sensor unit 3 is provided, and FIG. 3B is a sectional view of the sensor unit 3 as viewed from a direction indicated by a dotted line arrow in FIG. 3A. In addition, in FIGS. 3A to 3D, FIG. 3C is a diagram illustrating an example of an arrangement of touch sensors of different detection systems. In the present embodiment, the two kinds of touch sensors of different detection systems are a pressure sensing (resistance film type) sensor and a capacitive sensor.

As also described above, and as also illustrated in FIG. 3A, the sensor unit 3 is disposed on the sensor arrangement portion 31 of the flexible board 30. As illustrated in FIG. 3B, the sensor unit 3 is formed by laminating a substrate Bd1, a pressure sensing sensor CH5 (CH6), a substrate Bd2, and capacitive sensors CH1, CH2, CH3, and CH4 in this order from a lower side (flexible board 30 side). The capacitive sensors CH1, CH2, CH3, and CH4 are arranged on the same flat surface, i.e., on the substrate Bd2, as illustrated in FIG. 3B.

Figure 3C:
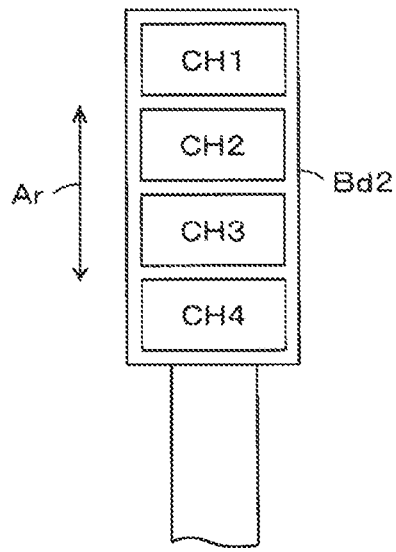

That is, as illustrated in FIGS. 3B and 3C, the capacitive sensors CH1, CH2, CH3, and CH4 are arranged in the axial direction (direction indicated by an arrow Ar in FIG. 3C) of the electronic pen. The capacitive sensors CH1, CH2, CH3, and CH4 are capable of detecting whether or not an operation is performed, by capturing a change in capacitance between a fingertip and a conductive film, and are capable of the detection even when the fingertip is merely brought into proximity.

The pressure sensing sensors CH5 and CH6 are arranged in a direction (direction indicated by an arrow Cr in FIG. 3D) intersecting the axial direction of the electronic pen. Incidentally, because FIG. 3B is a sectional view as viewed from the direction of the dotted line arrow in FIG. 3A, the pressure sensing sensor CH6 is located on an opposite side of the pressure sensing sensor CH5, and thus does not appear in FIG. 3B.

As illustrated in FIG. 3B, the pressure sensing sensor CH5 is formed by bonding a first electrode FE1 and a second electrode FE2 to each other by an adhesive layer Ads. In the pressure sensing sensor CH5, a voltage is applied to one of the two electrodes (resistance films) opposed to each other in advance, and when the pressure sensing sensor CH5 is depressed, the two electrodes approach each other, and a voltage occurs in the electrode to which no voltage is applied. The pressure sensing sensor CH5 can thus detect whether or not the pressure sensing sensor CH5 is depressed. Hence, unlike the capacitive sensors CH1, CH2, CH3, and CH4, no voltage occurs in the pressure sensing sensor CH5 when the fingertip is merely brought close, and the pressure sensing sensor CH5 does not produce a detection output unless a certain degree of pressure is applied. Incidentally, the pressure sensing sensor CH6 is also formed in a manner similar to that of the pressure sensing sensor CH5.

Thus, the capacitive sensors CH1, CH2, CH3, and CH4 can detect a fingertip of the user when the fingertip approaches to a certain distance. On the other hand, the pressure sensing sensors CH5 and CH6 cannot detect an operation unless pressed by applying a certain degree of force.

Figure 3D:
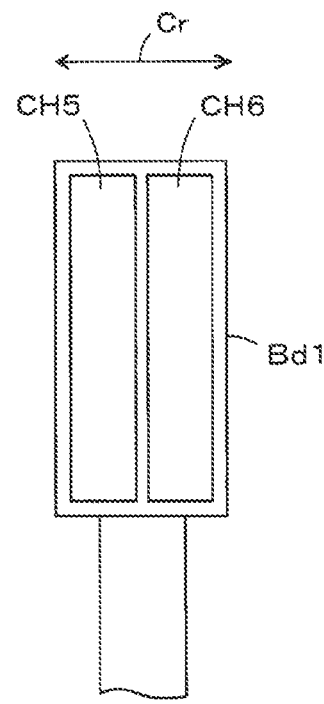

In the electronic pen according to the present embodiment, as illustrated in FIG. 3D, the sensor unit 3 (FIG. 3B) is formed by laminating the substrate Bd1, the pressure sensing sensors CH5 and CH6, the substrate Bd2, and the capacitive sensors CH1, CH2, CH3, and CH4 in this order. Thus, when a finger of the user lightly slides on the operating member 4, the operation is only detected by the capacitive sensors CH1, CH2, CH3, and CH4. However, suppose that a depressing operation is performed on the operating member 4 in such a manner as to apply a pressure equal to or higher than a predetermined value. In this case, capacitive sensors in a depressed part among the capacitive sensors CH1, CH2, CH3, and CH4 and the pressure sensing sensors CH5 and CH6 located on the lower side of the capacitive sensors can detect the pressing operation simultaneously.

Therefore, the side switch unit can receive a slide operation input in which only the capacitive sensors CH1, CH2, CH3, and CH4 of the sensor unit 3 function. In addition, the side switch unit can receive a depressing operation input in which both the capacitive sensors CH1, CH2, CH3, and CH4 and the pressure sensing sensors CH5 and CH6 function simultaneously. In addition, different operation inputs of a plurality of kinds can be received by taking into consideration also the positions of sensors that detect the operation inputs.

Specific Examples of Operation Mode

FIGS. 4A to 4C, FIGS. 5A to 5C, and FIGS. 6A to 6C are diagrams of assistance in explaining modes of operation on the side switch unit of the electronic pen according to the embodiment. FIGS. 4A to 4C are diagrams of assistance in explaining a slide operation that causes only the capacitive sensors CH1, CH2, CH3, and CH4 to detect the operation input without causing the pressure sensing sensors CH5 and CH6 to act. Suppose that, as illustrated in FIG. 4A, a slide-up operation is performed in which a fingertip of the user is lightly brought into contact with a position on the pen tip side on the operating member 4 of the side switch unit of the electronic pen according to the present embodiment, and while this state is maintained, the fingertip is slidingly moved in a direction indicated by an arrow a. In this case, as illustrated in FIG. 4B, the capacitive sensors CH1, CH2, CH3, and CH4 detect the operation by the fingertip in order of CH1→CH2→CH3→CH4. However, because no pressure equal to or higher than the predetermined value is applied, the pressure sensing sensors CH5 and CH6 do not detect the operation.

In addition, suppose that, as illustrated in FIG. 4A, a slide-down operation is performed in which a fingertip of the user is lightly brought into contact with a position on the rear end side on the operating member 4 of the side switch unit of the electronic pen according to the present embodiment, and while this state is maintained, the fingertip is slidingly moved in a direction indicated by an arrow b. In this case, as illustrated in FIG. 4C, the capacitive sensors CH1, CH2, CH3, and CH4 detect the operation by the fingertip in order of CH4→CH3→CH2→CH1. However, because no pressure equal to or higher than the predetermined value is applied, the pressure sensing sensors CH5 and CH6 do not detect the operation.

Thus, when the slide-up operation described with reference to FIG. 4B is performed, an information processing device provided with the position detecting device can be instructed to scroll up, for example, which moves a display image in an upward direction. In addition, when the slide-down operation described with reference to FIG. 4C is performed, the information processing device provided with the position detecting device can be instructed to scroll down, for example, which moves the display image in a downward direction.

FIGS. 5A to 5C are diagrams of assistance in explaining push operations in an upward-downward direction in which operations a pressure equal to or higher than the predetermined value is applied to cause both the capacitive sensors CH1, CH2, CH3, and CH4 and the pressure sensing sensors CH5 and CH6 to detect the operation input. Suppose that, as indicated by an arrow c in FIG. 5A, a depressing operation (upper push operation) is performed in such a manner as to apply a pressure equal to or higher than the predetermined value to a position on the rear end side on the operating member 4 of the side switch unit. In this case, as illustrated in FIG. 5B, the capacitive sensors CH3 and CH4 and the pressure sensing sensors CH5 and CH6 detect the depressing operation simultaneously.

In addition, suppose that, as indicated by an arrow d in FIG. 5A, a depressing operation (lower push operation) is performed in such a manner as to apply a pressure equal to or higher than the predetermined value to a position on the pen tip side on the operating member 4 of the side switch unit. In this case, as illustrated in FIG. 5C, the capacitive sensors CH1 and CH2 and the pressure sensing sensors CH5 and CH6 detect the depressing operation simultaneously. Thus, when the upper push operation described with reference to FIG. 5B is performed, the information processing device provided with the position detecting device can be instructed to click up, for example, which gives an instruction to display an image located on the upper side of an image currently being displayed. In addition, when the lower push operation described with reference to FIG. 5C is performed, the information processing device provided with the position detecting device can be instructed to click down, for example, which gives an instruction to display an image located on the lower side of the image currently being displayed.

Incidentally, in the case of the electronic pen according to the present embodiment, as described with reference to FIG. 1, the planar portion 1u of the holding member 1 is provided with the first projecting portions (ribs) 11 and 12. In this case, one first projecting portion 11 is provided between the capacitive sensor CH1 and the capacitive sensor CH2, and the other first projecting portion 12 is provided between the capacitive sensor CH3 and the capacitive sensor CH4.

Thus, when the position indicated by the arrow c in FIG. 5A is depressed, an effect can be exerted on the capacitive sensors CH3 and CH4, and a stronger pressing force can be exerted on the pressure sensing sensors CH5 and CH6 due to the first projecting portion 11. Similarly, when the position indicated by the arrow d in FIG. 5A is depressed, an effect can be exerted on the capacitive sensors CH1 and CH2, and a stronger pressing force can be exerted on the pressure sensing sensors CH5 and CH6 due to the first projecting portion 12. That is, the first projecting portions (ribs) 11 and 12 act in such a manner that a pressing force is surely applied to the pressure sensing sensors CH5 and CH6 irrespective of whether the pen tip side of the operating member 4 is depressed or whether the rear end side of the operating member 4 is depressed.

FIGS. 6A to 6C are diagrams of assistance in explaining push operations in a left-right direction in which operations a pressure equal to or higher than the predetermined value is applied to cause both the capacitive sensors CH1, CH2, CH3, and CH4 and the pressure sensing sensors CH5 and CH6 to detect the operation input. FIG. 6A assumes a case in which the electronic pen according to the present embodiment is gripped by a hand of the user, and supposes that an arrow e side is a right side and that an arrow f side is a left side. Suppose that, as indicated by an arrow e in FIG. 6A, a depressing operation (right push operation) is performed in such a manner as to apply a pressure equal to or higher than the predetermined value to a position on the right side on the operating member 4 of the side switch unit. In this case, as illustrated in FIG. 6B, the capacitive sensors CH2 and CH3 and the pressure sensing sensor CH6 detect the depressing operation simultaneously.

In addition, suppose that, as indicated by an arrow f in FIG. 6A, a depressing operation (lower push operation) is performed in such a manner as to apply a pressure equal to or higher than the predetermined value to a position on the left side on the operating member 4 of the side switch unit. In this case, as illustrated in FIG. 6C, the capacitive sensors CH2 and CH3 and the pressure sensing sensor CH5 detect the depressing operation simultaneously. Thus, when the right push operation described with reference to FIG. 6B is performed, the information processing device provided with the position detecting device can be instructed to push right, for example, which moves an image currently being displayed to the right side. In addition, when the lower push operation described with reference to FIG. 6C is performed, the information processing device provided with the position detecting device can be instructed to push left, for example, which moves the image currently being displayed to the left side.

Incidentally, in the case of the electronic pen according to the present embodiment, as described with reference to FIG. 1, the planar portion 1u of the holding member 1 is provided with the second projecting portion (pivot) 13. In this case, the second projecting portion 13 is provided between the pressure sensing sensor CH5 and the pressure sensing sensor CH6. That is, the second projecting portion 13 is provided in such a manner as to separate the pressure sensing sensor CH5 and the pressure sensing sensor CH6 to the left and right, respectively.

Thus, when the position indicated by the arrow e in FIG. 6A is depressed, an effect is exerted on the capacitive sensors CH3 and CH4. At the same time, because of the presence of the second projecting portion 13, it is possible to exert a pressing force on the pressure sensing sensor CH6 but not to exert a pressing force on the pressure sensing sensor CH5. Similarly, when the position indicated by the arrow f in FIG. 6A is depressed, an effect is exerted on the capacitive sensors CH3 and CH4. At the same time, because of the presence of the second projecting portion 13, it is possible to exert a pressing force on the pressure sensing sensor CH5 but not to exert a pressing force on the pressure sensing sensor CH6.

FIG. 7 is a diagram of assistance in explaining association of the modes of operation on the side switch unit of the electronic pen according to the embodiment with instruction contents. Information illustrated in FIG. 7 corresponds to information stored and retained in an instruction content determination table formed in a storage device of the information processing device provided with the position detecting device.

Suppose that the slide-up (upward slide) operation described with reference to FIG. 4B is performed on the side switch unit of the electronic pen according to the present embodiment. In this case, as indicated in the section of an upward slide in FIG. 7, such detection outputs are obtained that the capacitive sensors CH1, CH2, CH3, and CH4 sequentially change from "0 (off)" to "1 (on)" in order of CH1→CH2→CH3→CH4 and return to "0 (off)." On the other hand, the pressure sensing sensors CH5 and CH6 both remain "0 (off)." When such detection outputs are obtained, the information processing device side can determine that an instruction for sliding up is given, and perform processing accordingly.

In addition, suppose that the slide-down (downward slide) operation described with reference to FIG. 4C is performed on the side switch unit of the electronic pen according to the present embodiment. In this case, as indicated in the section of a downward slide in FIG. 7, such detection outputs are obtained that the capacitive sensors CH1, CH2, CH3, and CH4 sequentially change from "0 (off)" to "1 (on)" in order of CH4→CH3→CH2→CH1 and return to "0 (off)." On the other hand, the pressure sensing sensors CH5 and CH6 both remain "0 (off)." When such detection outputs are obtained, the information processing device side can determine that an instruction for sliding down is given, and perform processing accordingly.

In addition, suppose that the upper push operation described with reference to FIG. 5B is performed on the side switch unit of the electronic pen according to the present embodiment. In this case, as indicated in the section of an upper push in FIG. 7, the capacitive sensors CH3 and CH4 change to "1 (on)," and the pressure sensing sensors CH5 and CH6 both change to "1 (on)." When such detection outputs are obtained, the information processing device side can determine that an instruction for clicking up is given, and perform processing accordingly.

In addition, suppose that the lower push operation described with reference to FIG. 5C is performed on the side switch unit of the electronic pen according to the present embodiment. In this case, as indicated in the section of a lower push in FIG. 7, the capacitive sensors CH1 and CH2 change to "1 (on)," and the pressure sensing sensors CH5 and CH6 both change to "1 (on)." When such detection outputs are obtained, the information processing device side can determine that an instruction for clicking down is given, and perform processing accordingly.

In addition, suppose that the right push operation described with reference to FIG. 6B is performed on the side switch unit of the electronic pen according to the present embodiment. In this case, as indicated in the section of a right push in FIG. 7, the capacitive sensors CH2 and CH3 change to "1 (on)," and the pressure sensing sensor CH6 changes to "1 (on)." When such detection outputs are obtained, the information processing device side can determine that an instruction for clicking right is given, and perform processing accordingly.

In addition, suppose that the left push operation described with reference to FIG. 6C is performed on the side switch unit of the electronic pen according to the present embodiment. In this case, as indicated in the section of a left push in FIG. 7, the capacitive sensors CH2 and CH3 change to "1 (on)," and the pressure sensing sensor CH5 changes to "1 (on)." When such detection outputs are obtained, the information processing device side can determine that an instruction for clicking left is given, and perform processing accordingly.

Incidentally, though not illustrated in the figure, when the right side of a rear end of the side switch unit is pushed, the capacitive sensors CH3 and CH4 change to "1 (on)," and the pressure sensing sensor CH6 changes to "1 (on)." Similarly, when the left side of the rear end of the side switch unit is pushed, the capacitive sensors CH3 and CH4 change to "1 (on)," and the pressure sensing sensor CH5 changes to "1 (on)."

In addition, though not illustrated in the figure, when the right side of a front end (pen tip side) of the side switch unit is pushed, the capacitive sensors CH1 and CH2 change to "1 (on)," and the pressure sensing sensor CH6 changes to "1 (on)." Similarly, when the left side of the front end (pen tip side) of the side switch unit is pushed, the capacitive sensors CH1 and CH2 change to "1 (on)," and the pressure sensing sensor CH5 changes to "1 (on)." Hence, these operations can also be distinguished from one another, so that, needless to say, predetermined functions can be assigned to these operations.

Example of General Configuration of Electronic Pen

As also described above, the electronic pen according to the present embodiment can multiplex detection outputs from the sensor unit 3 constituting the side switch unit in a position indication signal and send out the multiplexed detection outputs to the position detecting device side, or send out the detection outputs to the position detecting device side by short-range wireless communication. However, the configuration of the electronic pen differs according to a method of transmitting the detection outputs. In the following, description will be made of an example of a configuration of an electronic pen that multiplexes the detection outputs from the sensor unit 3 in a position indication signal and sends out the multiplexed detection outputs to the position detecting device side and an example of a configuration of an electronic pen that sends out the detection outputs to the position detecting device side by short-range wireless communication. Incidentally, the electronic pens to be described in the following will be described as examples of a case where the present disclosure is applied to an electronic pen of the AES system that sends out a position indication signal from a conductive core body.

Figure 8:
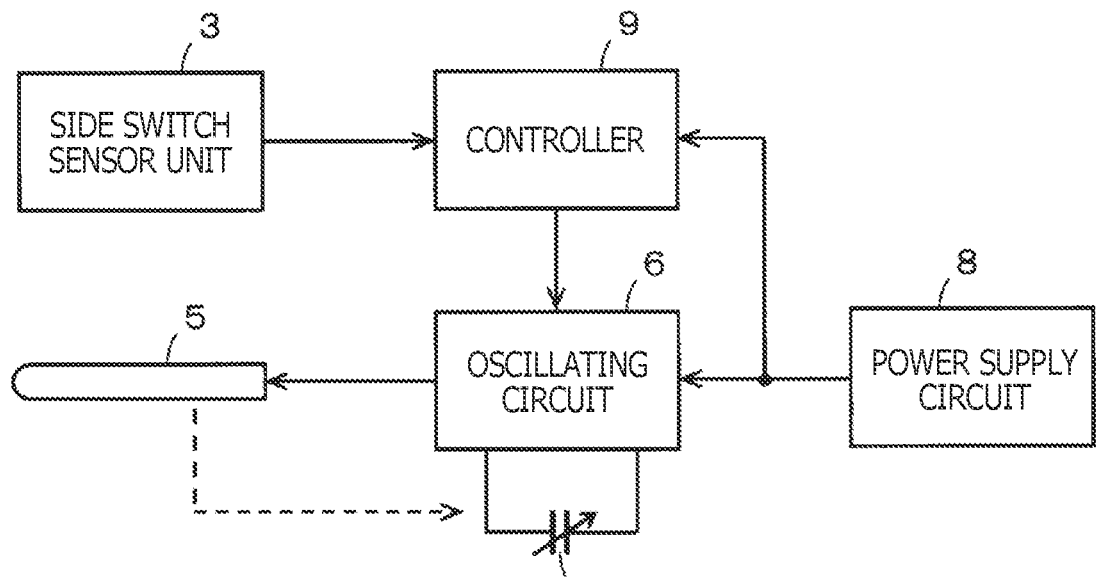
FIG. 8 is a block diagram of assistance in explaining an example of a configuration of an electronic pen in a case of multiplexing contents of operation on the side switch unit in a position indication signal and sending out the multiplexed operation contents.

FIG. 8 is a block diagram of assistance in explaining an example of a configuration of an electronic pen in a case of multiplexing contents of operation on the side switch unit in a position indication signal and sending out the multiplexed operation contents. The electronic pen illustrated in FIG. 8 includes a conductive core body 5, an oscillating circuit 6, a pen pressure detecting portion 7 having a configuration of a variable-capacitance capacitor, a power supply circuit 8, and a controller 9, and is configured such that the detection outputs from the sensor unit 3 of the side switch unit are supplied to the controller 9. The oscillating circuit 6 and the controller 9 can be driven by being supplied with driving electric power from the power supply circuit 8.

In the case of the electronic pen illustrated in FIG. 8, the controller 9 controls the oscillating circuit 6 to shift sending-out timing of the position indication signal and sending-out timing of the detection outputs from the sensor unit 3 from each other, the position indication signal and the detection outputs being sent out through the core body 5. That is, in timing of sending out the position indication signal, the controller 9 controls the oscillating circuit 6 to oscillate a predetermined position indication signal and send out the position indication signal through the core body 5. In addition, in timing of sending out the detection outputs from the sensor unit 3, the controller 9 supplies the detection outputs from the sensor unit 3 to the oscillating circuit 6.

The oscillating circuit 6 oscillates a signal corresponding to the detection outputs of the sensor unit 3 from the controller 9, and sends out the signal through the core body 5. Thus, the position indication signal and the detection outputs from the sensor unit 3 can be time-division multiplexed, output from the core body 5, and transmitted to the position detecting device side. Incidentally, information indicating a pen pressure can be included in the position indication signal, or the information indicating the pen pressure can also be time-division multiplexed and transmitted.

Figure 9:
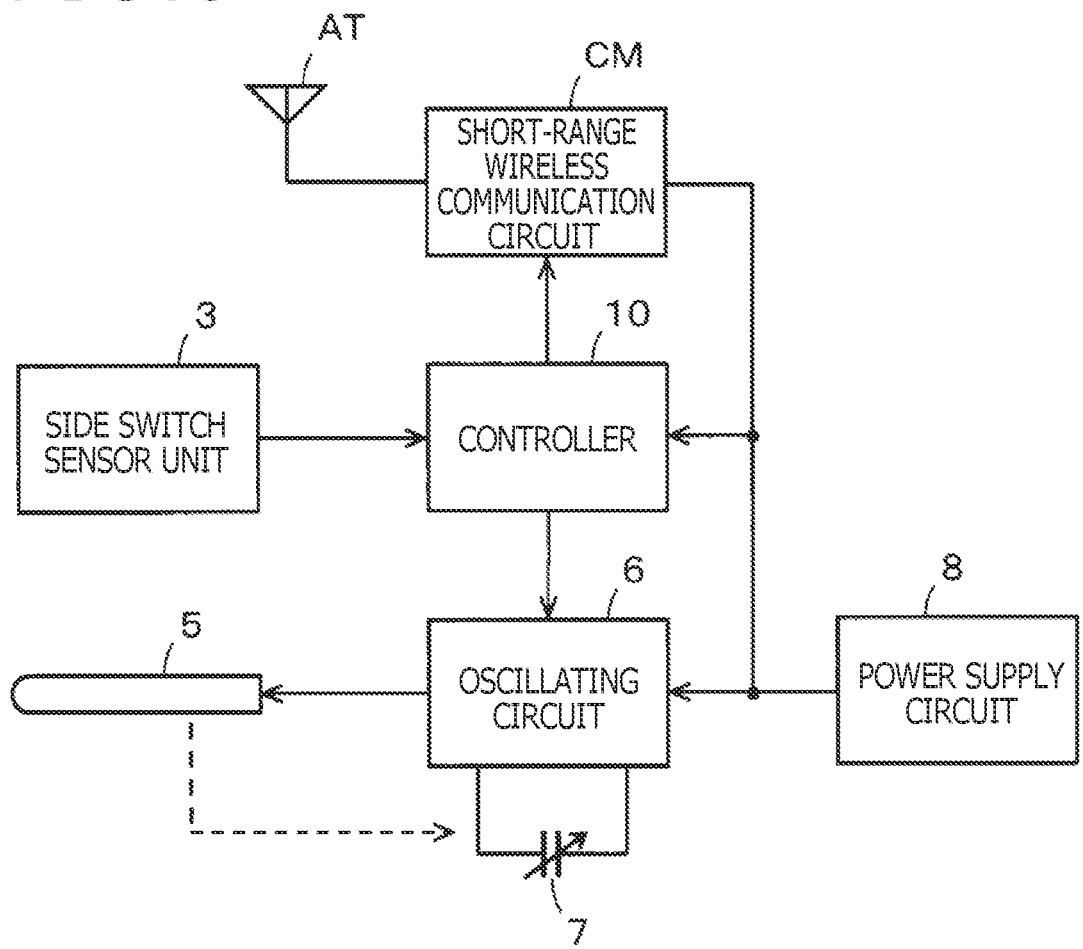
FIG. 9 is a block diagram of assistance in explaining an example of a configuration of an electronic pen in a case of sending out contents of operation on the side switch unit by short-range wireless communication.

FIG. 9 is a block diagram of assistance in explaining an example of a configuration of an electronic pen in a case of sending out contents of operation on the side switch unit by short-range wireless communication. The electronic pen illustrated in FIG. 9 includes a conductive core body 5, an oscillating circuit 6, a pen pressure detecting portion 7 having a configuration of a variable-capacitance capacitor, a power supply circuit 8, a controller 10, a short-range wireless communication circuit CM, and an antenna AT. The electronic pen in the present example is also configured such that the detection outputs from the sensor unit 3 of the side switch unit are supplied to the controller 10. The oscillating circuit 6, the controller 10, and the short-range wireless communication circuit CM can be driven by being supplied with driving electric power from the power supply circuit 8.

In the case of the electronic pen illustrated in FIG. 9, the controller 10 controls the oscillating circuit 6 to generate a position indication signal and send out the position indication signal through the core body 5. Further, the controller 10 performs control to form a transmission signal from the detection outputs from the sensor unit 3 of the side switch unit, supply the transmission signal to the short-range wireless communication circuit CM, and transmit the transmission signal through the antenna AT. Thus, the position indication signal can be transmitted to the position detecting device side through the core body 5, as is conventional, and the detection outputs from the sensor unit 3 can be transmitted to the information processing device of the position detecting device side by short-range wireless communication.

Thus, according to the configuration of the electronic pen, the detection outputs from the sensor unit 3 constituting the side switch unit can be multiplexed in a position indication signal and sent out from the core body 5, or can be sent out by short-range wireless communication. As to a path by which to send out the detection outputs from the sensor unit 3, it suffices to use an appropriate path according to functions of the position detecting device, functions of the information processing device of the position detecting device side, and the like.

Incidentally, in a case where the electronic pen is an electronic pen of the EMR system, a variable-capacitance capacitor that changes in capacitance according to the detection outputs from the sensor unit 3 is connected in parallel to a resonance circuit in advance. Thus, the detection outputs from the sensor unit 3 can be superimposed and sent out as a change in phase of the position indication signal. In addition, also in the case of the electronic pen of the EMR system, the position indication signal and the detection outputs from the sensor unit 3 can be sent out through the same path by time-division multiplexing that separates the sending-out timing of the usual position indication signal and the transmission timing of the detection outputs from the sensor unit 3 from each other. In addition, also in the case of the electronic pen of the EMR system, as in the case of the electronic pen illustrated in FIG. 9, the detection outputs from the sensor unit 3 can be sent out by short-range wireless communication separately from the position indication signal.

Effects of Embodiment

According to the electronic pen in the foregoing embodiment, it is possible to realize an electronic pen including a side switch that has a simple configuration and enables instruction inputs of a plurality of states to be performed easily and properly. More specifically, by superimposing and arranging touch sensors of different detection systems, it is possible to realize an electronic pen including a side switch that can receive many kinds of operation inputs without increasing the size of the side switch unit itself.

Modifications

Incidentally, in the case of the electronic pen according to the foregoing embodiment, the sensor unit is formed by providing the pressure sensing sensors in a lower layer and providing the capacitive sensors in an upper layer as viewed from an operation surface side. However, there is no limitation to this. The sensor unit may be formed by providing the capacitive sensors in the lower layer and providing the pressure sensing sensors in the upper layer as viewed from the operation surface side.

In addition, in the case of the electronic pen according to the foregoing embodiment, the four capacitive sensors are provided in the axial direction, and the two pressure sensing sensors are provided in a direction intersecting the axial direction. However, there is no limitation to this. It suffices to provide two or more capacitive sensors in the axial direction and provide two or more pressure sensing sensors in the direction intersecting the axial direction. That is, the sensor unit 3 can be formed by arranging a plurality of capacitive sensors in the axial direction and arranging a plurality of pressure sensing sensors in the direction intersecting the axial direction.

In addition, in the case of the electronic pen according to the foregoing embodiment, the planar portion 1*u* of the holding member 1 is provided with the first projecting portions (ribs) 11 and 12 and the second projecting portion (pivot) 13 to thereby obtain the detection outputs from the sensor unit 3 appropriately. However, there is no limitation to this. As long as desired detection outputs are obtained, the first projecting portions (ribs) 11 and 12 and the second projecting portion (pivot) 13 may not be provided. In addition, it is possible to provide the planar portion 1*u* of the holding member 1 with the first projecting portions (ribs) 11 and 12 and not to provide the planar portion 1*u* with the second projecting portion (pivot) 13, or conversely, it is possible to provide the planar portion 1*u* with the second projecting portion 13 and not to provide the planar portion 1*u* with the first projecting portions 11 and 12.

In addition, in the case of sending out the detection outputs from the sensor unit 3 by short-range wireless communication, short-range wireless communications of various standards including the Bluetooth (registered trademark) standard can be used. In addition, the electronic pen and the information processing device operated by using the electronic pen are usually present in close vicinity to each other. Therefore, the detection outputs from the sensor unit 3 can be transmitted to the information processing device side by using infrared communication. In addition, it is possible to establish a wired connection between the electronic pen and the information processing device operated by using the electronic pen, by using a cable, and transmit the detection outputs from the sensor unit 3 through the cable.

In addition, in the foregoing embodiment, the holding member 1 has been described as having a substantially cylindrical shape. However, there is no limitation to this. A function of the holding member 1 is to prevent a pressure from being applied to the electronic pen main body unit when the side switch unit is depressed. Therefore, needless to say, the holding member 1 may be formed in what is generally called a half pipe shape obtained by cutting a pipe in half in a longitudinal direction or as a plate-shaped body, and fixed to the inner wall surface of the pen body PB.

In addition, in the foregoing embodiment, description has been made of six kinds of possible inputs, that is, sliding up, sliding down, clicking up, clicking down, clicking right, and clicking left through the side switch unit. It is possible to determine on the information processing device side what processing to perform in response to these operation inputs.

In addition, in the foregoing embodiment, description has been made of the use of capacitive sensors and pressure sensing sensors as two kinds of touch sensors of different detection systems. However, there is no limitation to this. For example, pressure sensing sensors having a configuration of a button switch can be used. That is, the side switch unit of the electronic pen according to the present disclosure can be formed by using capacitive sensors and what is generally called force sensors capable of detecting pressing. However, in the case of using the capacitive sensors and the pressure sensing sensors, it is possible to reduce both the thickness of the side switch unit and the area of the operation surface.

In addition, the pen body PB may be formed as a tubular body having a polygonal section in a direction intersecting the axial direction, and side switch units of the above-described configuration may be provided to a plurality of different side surfaces. In addition, depending on the width of a side surface, one pressure sensing sensor, rather than a plurality of pressure sensing sensors, may be provided. In this case, left and right clicking operations cannot be performed. However, it suffices to change operation contents received by the side switch units for the respective side surfaces of the pen body, for example. In addition, needless to say, only the part provided with the side switch unit in the pen body PB may be formed in a planar shape.

DESCRIPTION OF REFERENCE SYMBOLS

FC: Front cap
PB: Pen body
1: Holding member
11, 12: First projecting portion (rib)
13: Second projecting portion (pivot)
14, 15: Fitting hole
2: Elastic member
21, 22: First hole portion
23: Second hole portion
24: Slit
3: Sensor unit
30: Flexible board
31: Sensor arrangement portion
31a, 31b: Hole portion
32: Extending portion
33: Connector portion
4: Operating member
41a, 41b: Leg portion
CH1, CH2, CH3, CH4: Capacitive sensor
CH5, CH6: Pressure sensing sensor
Bd1, Bd2: Substrate
FE1: First electrode
FE2: Second electrode
Ads: Adhesive layer
5: Core body
6: Oscillating circuit
7: Pen pressure detecting portion
8: Power supply circuit
9, 10: Controller
CM: Short-range wireless communication circuit
AT: Antenna The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
a tubular casing configured to be held by a user; and
a side switch unit provided at a side surface of the tubular casing, wherein the side switch unit includes an operating member configured to receive an operation input by the user,
wherein the side switch unit includes a sensor unit in which two kinds of touch sensors of different detection systems are disposed such that respective sensor regions of the two kinds of the touch sensors are superimposed on each other,
wherein the two kinds of touch sensors are a capacitive touch sensor and a pressure sensing touch sensor,
wherein the capacitive touch sensor includes a plurality of capacitive touch sensors arranged in an axial direction of the tubular casing,
wherein the pressure sensing touch sensor includes a plurality of pressure sensing touch sensors arranged in a direction intersecting the axial direction of the tubular casing,
wherein the capacitive touch sensor is interposed between the operating member of the side switch unit and the pressure sensing touch sensor,
wherein the side switch unit includes:
a holding member disposed within the tubular casing, and
an elastic member disposed on an upper surface of the holding member, and
wherein the operating member is disposed on an upper surface of the elastic member, and
wherein the sensor unit is disposed between the elastic member and the operating member.

2. The electronic pen according to claim 1, wherein:
the capacitive touch sensor is on an upper side of the side switch unit, and the pressure sensing touch sensor is on a lower side of the side switch unit.

3. The electronic pen according to claim 1, wherein:
the holding member has a projecting portion that divides an operation region in an axial direction of the tubular casing and has a width extending in the direction intersecting the axial direction, and
the elastic member has a hole portion into which the projecting portion is fitted at a position corresponding to the projecting portion.

4. The electronic pen according to claim 1, wherein:
the holding member has a projecting portion that divides an operation region in the direction intersecting an axial direction of the tubular casing and has a width extending in the axial direction, and
the elastic member has a hole portion into which the projecting portion is fitted at a position corresponding to the projecting portion.

5. The electronic pen according to claim 1, wherein:
the holding member has a first projecting portion that divides an operation region in an axial direction of the tubular casing and has a width extending in the direction intersecting the axial direction and a second projecting portion that divides the operation region in a direction intersecting the axial direction and has a width extending in the axial direction, and the elastic member has a first hole portion into which the first projecting portion is fitted at a position corresponding to the first projecting portion and a second hole portion into which the second projecting portion is fitted at a position corresponding to the second projecting portion.

6. The electronic pen according to claim 1, wherein:

the tubular casing has a polygonal section in the direction intersecting an axial direction of the tubular casing, and the side switch unit is provided at one or more different side surfaces of the polygonal section of the tubular casing.

7. The electronic pen according to claim 1, comprising:

an oscillating circuit; and a core body formed of a conductive material, wherein the core body, in operation, transmits a signal from the oscillating circuit, wherein the oscillating circuit, in operation, multiplexes an instruction input received through the sensor unit in a position indication signal and supplies the multiplexed instruction input to the core body.

8. The electronic pen according to claim 1, comprising:

a short-range wireless communication circuit, wherein the short-range wireless communication circuit includes an instruction input received through the sensor unit in a signal to be output, and transmits the instruction input.

9. The electronic pen according to claim 1, wherein:

each of the capacitive touch sensors and the pressure sensing touch sensors produces a detection output corresponding to either "on" or "off", and the sensor unit is configured such that, in response to a slide operation on the operation member in the axial direction of the tubular casing, the capacitive touch sensors sequentially produce detection outputs corresponding to "on" and the pressure sensing touch sensors produce detection outputs corresponding to "off".

* * * * *